United States Patent Office 3,244,427
Patented Apr. 5, 1966

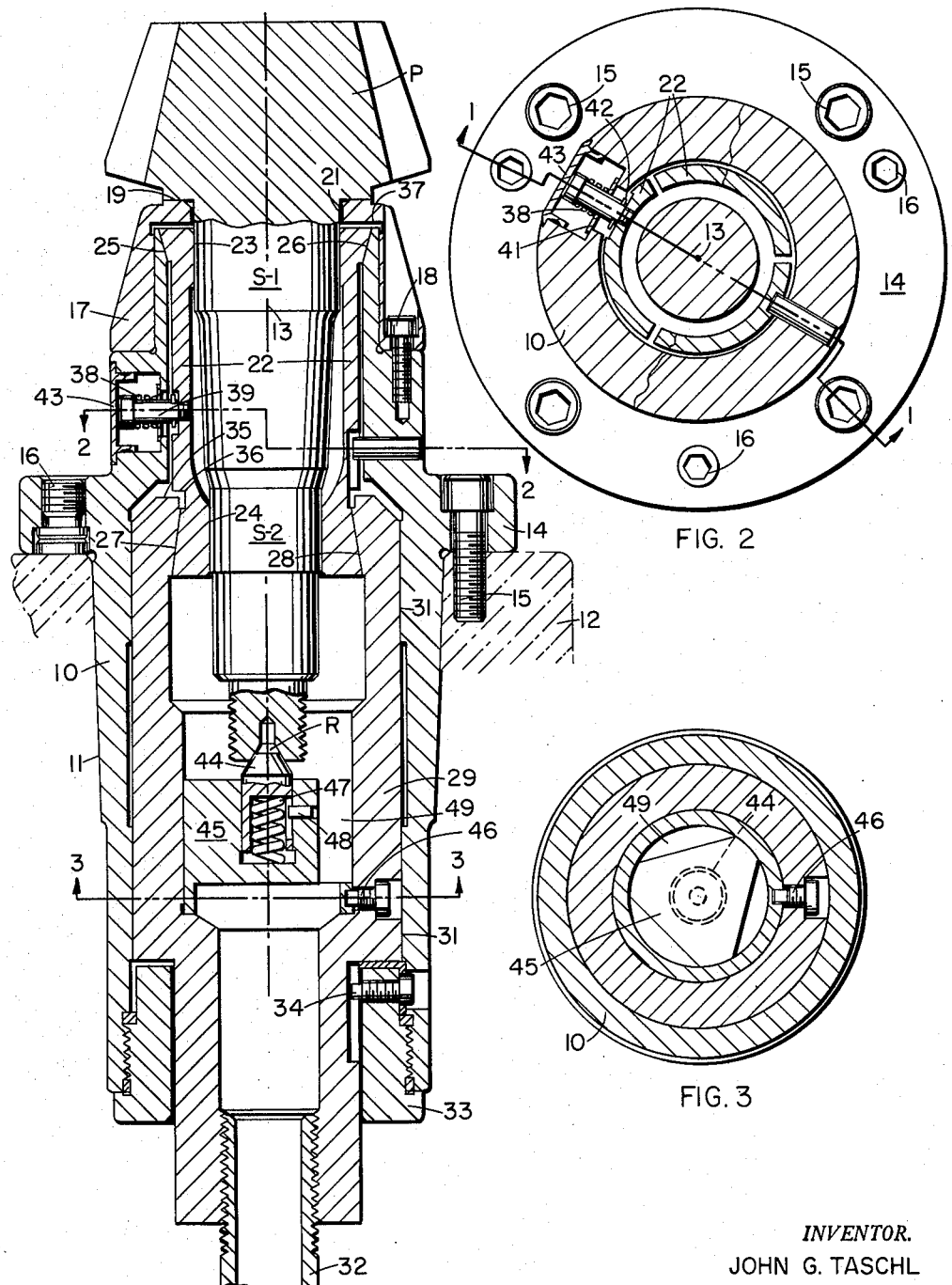

3,244,427
CHUCK FOR SHANK PINIONS AND THE LIKE
John G. Taschl, Rochester, N.Y., assignor to The Gleason Works, Rochester, N.Y., a corporation of New York
Filed Oct. 23, 1964, Ser. No. 405,969
8 Claims. (Cl. 279—57)

The present invention relates to a chuck for shank pinions and the like, the chuck being of the kind having jaws which close radially upon the workpiece shank upon axial motion of a chuck actuator.

Objects of the invention are such a chuck which will have a wide tolerance as to the diameter of the pinion shank it will accommodate; which will, as it closes upon the shank, draw the shank into the chuck to cause the pinion head to seat against the front piece of the chuck; and which will grip and center portions of the shank that are widely spaced axially, so as to accurately align the shank in the chuck.

A chuck according to the invention comprises a tubular body, an actuator slidable axially in the body, and a plurality of jaws arranged in a circle inside the body, each jaw having (a) an inner surface to grip the shank of a pinion inserted in the chuck, (b) adjacent the front thereof an outside cam face inclining inwardly from front to rear and (c) adjacent the rear thereof an outside cam face inclining outwardly from front to rear, the body having a cam face portion substantially complementary to and slidably related to each of said cam faces at the front of the jaws and the actuator having a cam face portion substantially complementary to and slidably related to each of said cam faces at the rear of the jaws, whereby the jaws will be cammed radially inward to grip the shank upon rearward motion of the actuator in the body.

A preferred embodiment of the invention is shown in the accompanying drawings wherein:

FIG. 1 is an axial section through the chuck in the planes designated 1—1 in FIG. 2, the chuck being shown with a pinion held therein; and, FIGS. 2 and 3 are cross-sections in the respective planes designated 2—2 and 3—3 in FIG. 1.

The chuck comprises a tubular body whose main section 10 has a slightly tapered outer surface 11 seated with a draw fit in the similarly tapered bore of work spindle 12 of a pinion tooth cutting machine. The axis of rotation of the spindle, which is also the longitudinal axis of chuck body, is designated 13. A flange 14 on the body section 10 seats upon the adjacent end face of the spindle, and is secured to the spindle by screws 15. Jack screws 16 are threaded to the flange for the purpose of drawing the chuck from the spindle when desired.

The chuck body includes a front piece 17 secured by several screws 18 to the end of body section 10 that is uppermost in FIG. 1, and which will for purposes of reference be called the front or forward end. Depending upon the machine configuration the axis 13 may be vertical, horizontal or inclined when the chuck is in use. The front surface 19 of the front piece 17 seats the back face of the head of bevel pinion P, the shank of the pinion extending through a pilot opening 21 in the front piece into the chuck interior. Three identical jaws 22 arranged in a circle around axis 13 inside the chuck body have, on their radially inner sides, concave cylindrical surfaces 23 and 24 which are substantially complementary to, and are adapted to grip, axially spaced cylindrical surfaces S–1 and S–2 of the pinion shank. On their radially outer sides the jaws have, at the front portions thereof, cam surfaces 25 which incline inwardly from front to back, and have sliding contact with a complementary surface or surfaces 26 of body section 10. While these surfaces 25 and 26 may be plane if desired, in the illustrated embodiment they are conical surfaces whose cone axes are substantially coincident with axis 13.

The rear portions of the jaws 22 have inclined cam surfaces 27, which in the illustrated embodiment are also conical surfaces substantially coaxial of axis 13 and have sliding contact with a complementary conical surface 28 on the inside of a tubular chuck actuator 29. The latter is slidable axially of the chuck on internal cylindrical surfaces 31 of body section 10, such axial motion being effected by a piston (not shown). This piston and the actuator 29 are screw-threaded to a tubular draw rod 32 which constitutes an adjustable length connector between them. As shown, the cam surfaces 27, 28 incline outwardly from front to rear of the chuck. Actuator 29 is retained in the chuck body by a rear closure ring 33 screw-threaded to body section 10. A key 34 secured to ring 33 extends into a keyway in the actuator 29 to hold it against unintentional rotation.

If desired the jaws 22 could be formed as a single tubular member slotted longitudinally so as to constitute a radially contractible collet. However it is preferred, in the interests of providing wide opening of the chuck for easy entry of the pinion shank, and of accommodating variations in shank diameters over a wide tolerance range, that the jaws be separate members. They are preferably made identical by machining them as single tubular member and then dividing them by longitudinal cuts.

As shown, the cam surfaces 27, 28 are inclined to axis 13 at a smaller angle than surfaces 25, 26. In the illustrated embodiment the inclination of surfaces 25, 26 is about 15°, a non-locking angle, while that of surfaces 27, 28 is a locking or near-locking angle of about 7°. The front face 35 of the actuator is adapted to abut shoulders 36 of the jaws, and may do so during mounting of the chuck and adjustment of the draw rod 32 to determine the position of actuator 29 when the piston reaches the limit of its forward stroke. In operation of the chuck in the intended manner the surfaces 35, 36 are slightly spaced when the actuator is in its forward limit position. The forward motion of jaws 22 is limited by their abutment with shoulder 37 of front piece 17. The parts are so proportioned and adjusted that such abutment occurs prior to the actuator 29 reaching its forward limit position.

The jaws 22 may be held yieldably against the chuck body in various ways. In the illustrated chuck there is for this purpose a coil spring 38 for each jaw 22, the spring being supported by a headed stud 39 screw-threaded to the jaw and extending with clearance through a radial aperture in the chuck body. The spring acts in compression, between the head of the stud and a washer 41 which bears on a surface of the body section 10, to yieldably hold the jaw against the cam surfaces 26 and 28 of body section 10 and actuator 29. The stud, spring and washer are held together by a snap ring 42 to facilitate their assembly with the body section and jaw 22. Detachable covers 43 on the body section 10 keep cutting chips and the like away from the spring and stud assemblies.

Chucking of a pinion P is effected by inserting the pinion shank in the position shown while the actuator 29 is in its forward limit position (its upward limit position as the chuck is oriented in FIG. 1), and the jaws are held in their foremost position, wherein they abut shoulder 37, by the action of spring 38 and cam surfaces 25, 26. The piston is then operated to draw the actuator 29 rearwardly. During initial rearward motion the rear portions of the jaws are moved radially inward by cam action of surfaces 27, 28, causing surfaces 24 to grip section S–2 of the shank; and continued rearward motion of the actuator causes the jaws also to move rearwardly against resistance imposed by springs 38. This rearward motion of the jaws draws the pinion head firmly against seat 19, and, by cam action of surfaces 25, 26, causes the jaw surfaces 23 to grip section S–1 of the shank. The rearward pressure finally exerted by the piston against the actuator 29 and the jaws acts, by camming of surfaces 27, 28 and of surfaces 25, 26, to hold the jaws firmly clamped to the chuck body and to the pinion shank. Since the rearward motion can continue until jaw surfaces 25 have moved far enough on body surface 26 to cause section S–1 of the shank to be gripped, and until actuator surface 28 has moved far enough on jaw surface 27 to cause section S–2 of the shank to be gripped, the chuck will accommodate pinions wherein the diameters of shank sections S–1 and S–2 vary over a wide tolerance range.

At the conclusion of the ensuing tooth cutting operation the workpiece is unclamped by forward motion of the actuator 29 effected by the piston. At the beginning of this motion the actuator, jaws, and workpiece move forwardly as a unit because of the locking or near-locking angle of cam surfaces 27, 28 and the free-releasing angle of cam surfaces 25, 26. Upon abutment of jaws 22 with shoulder 37 of the front piece, the continued forward motion of the actuator disengages the surfaces 27, 28, thereby completing release of the workpiece which may then be freely lifted from the chuck. The springs 38 retain the jaws in their foremost position, and the chuck is ready to receive the next workpiece.

In instances where the workpiece must be mounted in a particular angular relation to the chuck, as for example where pinion teeth are to be finish cut after a preceding rough cutting operation, it may be necessary to rotate the workpiece after it is inserted into the chuck and before the jaws are closed. To facilitate such rotation, especially in cases where the axis 13 is vertical during the loading operation, the chuck may be provided with a centering pin 44 having a tapered end adapted to fit a centering recess R in the end face of the pinion shank. The pin 44 is axially slidable in a support 45 held in the bore of actuator 29 by a screw 46. A spring 47 acting between support 45 and pin 44 is preferably so proportioned as to yieldably retain the pinion head just clear of or bearing only lightly against seat 19. The pinion then can be rotated easily, yet when the jaws 22 are closed by rearward motion thereof, the pinion head is drawn firmly against seat 19. A key 48 engaged in a keyway in centering pin 44 retains the latter and hold its against rotation. When not needed the assembly comprising screw 46, center pin 44 and support 45 may be readily removed.

As shown the support 45 comprises a ring-shaped section fitting the bore of actuator 29 and, integral therewith, a triangularly shaped pin-supporting section. This formation provides openings 49 through the support, so that after each workpiece is removed the interior of the chuck may be flushed with a stream of cutting oil or other fluid to clear it of cutting chips and other foreign matter. The fluid may either enter or leave the chuck through the tubular draw rod 32.

Having now described the preferred embodiment of my invention, and its operation and advantages, what I claim is:

1. A chuck for shank pinions comprising a tubular body, an actuator slidable axially in the body, and a plurality of jaws arranged in a circle inside the body, each jaw having (a) an inner surface to grip the shank of a pinion inserted in the chuck, (b) adjacent the front thereof an outside cam face inclining inwardly from front to rear and (c) adjacent the rear thereof an outside cam face inclining outwardly from front to rear, the body having a cam face portion substantially complementary to and slidably related to each of said cam faces at the front of the jaws and the actuator having a cam face portion substantially complementary to and slidably related to each of the said cam faces at the rear of the jaws, whereby the jaws will be cammed radially inward to grip the shank upon rearward motion of the actuator in the body.

2. A chuck according to claim 1 in which the front and rear cam faces incline to the cutter axis respectively at a free-releasing angle and at an at least near-locking angle, and the chuck body has an abutment surface for arresting forward motion of the jaws before the actuator reaches its foremost limit position, to thereby effect disengagement of the actuator from said rear cam faces.

3. A chuck according to claim 1 having yieldable means for holding the jaws radially outward against the body and actuator.

4. A chuck according to claim 3 in which said yieldable means comprise a spring for each jaw, the spring being compressed between a washer engaging an outer surface of the chuck body and the head of a stud whose shank extends with clearance through an aperture in the chuck body and is secured to the jaw.

5. A chuck according to claim 1 in which each of said cam faces and cam face portions is a conical surface substantially coaxial of axis of the chuck body.

6. A chuck according to claim 1 in which each jaw has axially spaced inner surfaces adjacent the front and rear thereof for respectively gripping axially spaced portions of the shanks.

7. A chuck according to claim 1 in which there is a spring-backed centering pin supported by the actuator for engagement in a centering recess in the end face of the shank.

8. A chuck according to claim 7 in which said actuator is substantially tubular and the support for said centering pin has apertures therethrough to enable flow of liquid through the chuck.

References Cited by the Examiner
UNITED STATES PATENTS

| | | | |
|---|---|---|---|
| 2,718,402 | 9/1955 | Peters | 279—50 |
| 3,083,976 | 4/1963 | Stark | 279—51 |

FOREIGN PATENTS

| | | |
|---|---|---|
| 429,919 | 6/1935 | Great Britain. |

ROBERT C. RIORDON, *Primary Examiner.*
HAROLD V. STAHLHUTH, *Assistant Examiner.*